Patented Apr. 2, 1940

2,195,443

UNITED STATES PATENT OFFICE 2,195,443

DISAZO DYES

Walther Benade, Dessau in Anhalt, Germany, assignor to General Aniline & Film Corporation, a corporation of Delaware No Drawing. Application September 22, 1938, Serial No. 231,167. In Germany October 8, 1937

8 Claims. (Cl. 260—184)

My present invention relates to a process for manufacturing new azo dyes and to the new dyes obtained by this process. More particularly, it relates to substantive disazo dyes, which are capable of forming copper complex compounds either in substance or on the fibers dyed therewith.

My new dyes having the aforesaid properties relate to the general formula

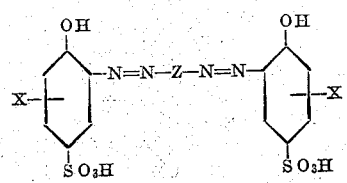

wherein X is either hydrogen or Cl, alkyl or $NO_2$ and Z is an arylamide of the 2-hydroxynaphthalene-6-carboxylic acid which has substantive properties.

Suitable arylamides of the 2-hydroxynaphthalene-6-carboxylic acid are, for instance, the condensation products obtained from 2 molecular proportions of 2-hydroxynaphthalene-6-carboxylic acid with 1 molecular proportion of a 4.4'-diaminodiphenyl or a 4.4'-diaminodiphenyl urea, furthermore, for instance, the condensation product from 1 molecular proportion of 2-hydroxynaphthalene-6-carboxylic acid with 1 molecular proportion of 2-amino-5-hydroxynaphthalene-7-sulfonic acid.

The dyes obtainable according to the present invention may be transformed, in substance or on the fiber, into their copper compounds and yield on cotton dyeings of good properties of fastness.

The following examples serve to illustrate the invention, the parts being by weight:

Example 1.—22.35 parts of 6-chloro-2-amino-1-hydroxybenzene-4-sulfonic acid are diazotized, while adding 5 parts of hydrochloric acid of 12° Bé., with 6.9 parts of sodium nitrite in about 300 parts of water and combined with a solution of 32.8 parts of sodium-bis-(2'-hydroxy-6'-naphthoyl)-4.4'-diaminodiphenyl-3.3' - dicarboxylate and 4 parts of sodium hydroxide in 500 parts of water. When coupling is complete, the dye is salted out in the usual manner, separated and dried.

Dyed on cotton and after-treated on the fiber with copper sulfate, the dye yields red tints of very good fastness to light.

Example 2.—A diazo solution prepared from 18.9 parts of 2-amino-1-hydroxybenzene-4-sulfonic acid, 5 parts of hydrochloric acid of 12° Bé. and 6.9 parts of sodium nitrite in about 300 parts of water is run into a solution of 21.5 parts of 2-(2'-hydroxy-6'-naphthoyl)-amino-5- hydroxynaphthalene-7-sulfonic acid and 4 parts of sodium hydroxide in 500 parts of water. When the coupling is complete, the dye formed is separated in the usual manner, re-dissolved in about 1000 parts of water and transformed into the copper compound by addition of 25 parts of crystallized copper sulfate.

The separated and dried cupriferous dye dissolves in water to a red solution and dyes cotton red tints of very good fastness to light.

Example 3.—29.2 parts of bis-(2'-hydroxy-6'-naphthoyl)-4.4'-diamino-3.3'-dimethoxydiphenyl are dissolved in about 500 parts of water with 4.5 parts of sodium hydroxide and combined with a diazo solution prepared from 18.9 parts of 2-amino-1-hydroxybenzene-4-sulfonic acid, 5 parts of hydrochloric acid of 12° Bé. and 6.9 parts of sodium nitrite in about 300 parts of water. The dye obtained is salted out, separated and dried. When dyed on cotton and aftertreated with copper sulfate, the dye yields red tints of good fastness properties.

Example 4.—29.2 parts of bis-(2'-hydroxy-6'-naphthoyl)-4.4'-diamino-3.3'-dimethoxydiphenyl are dissolved together with 4.5 parts of sodium hydroxide in about 500 parts of water. This solution is united with the diazo compound prepared from 22.35 parts of 6-chloro-2-amino-1-hydroxybenzene in about 300 parts of water by addition of 5 parts of hydrochloric acid of 12° Bé. and 6.9 parts of sodium nitrite. The dye thus obtained is salted out, separated and dried. It dyes on cotton, when after-treated on the fiber with copper sulfate, red tints of good fastness.

Example 5.—Into a solution of 29.2 parts of bis-(2'-hydroxy-6'-naphthoyl)-4.4'-diamino-3.3' dimethoxydiphenyl and 5 parts of sodium hydroxide in 1000 parts of water is run the diazo compound prepared from 23.4 parts of 6-nitro-2-amino-1-hydroxybenzene-4-sulfonic acid in 500 parts of water. When coupling is complete, the dye is separated as usual. It dyes on cotton, when after-treated on the fiber with copper sulfate, Bordeaux-red tints of good fastness.

It is obvious that my invention is not limited to the foregoing examples or to the specific details given therein. Thus, I may use, for instance, as diazo component an alkyl-1-hydroxy-2-aminobenzene-4-sulfonic acid or 5-nitro- or chloro - 1 - hydroxy - 2 -aminobenzene-4-sulfonic acid. The bis-(2'-hydroxy-6'-naphthoyl)-4.4'-diaminodiphenyl, used as azo component, may contain other substituents as those mentioned in the examples, such as, for instance, chlorine or alkyl or a sulfonic acid radicle. As mentioned above, urea compounds are also suitable, as, for instance, bis-(2-hydroxy-6'-naphthoyl)-4.4'-diaminodiphenylurea, bis-(2'-hydroxy-6'-naphthoyl)-4.4'-diamino-3.3'-dicarboxydiphenylurea or similar compounds containing alkyl-, alkoxy groups or halogen as substituents.

What I claim is:

1. The disazo dyes corresponding to the general formula

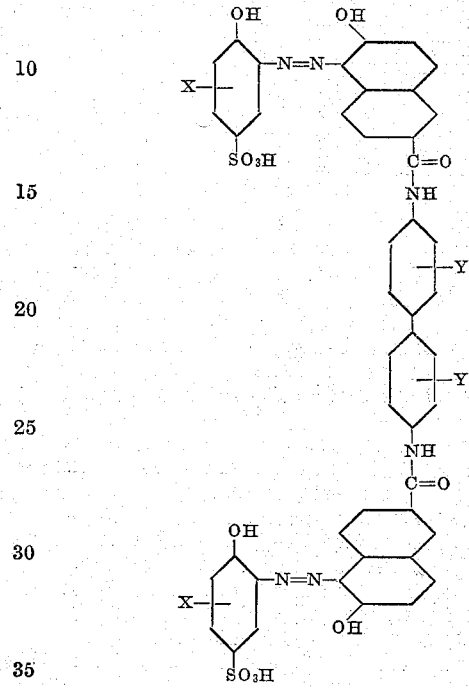

wherein X is a member of the group consisting of hydrogen, chlorine, alkyl and the nitro group, and Y and Y' are members of the group consisting of hydrogen, alkyl, alkoxy, chlorine, —COOH and —SO₃H, said dyes forming copper complex compounds and dyeing cotton red tints of good fastness.

2. The disazo dyes corresponding to the general formula

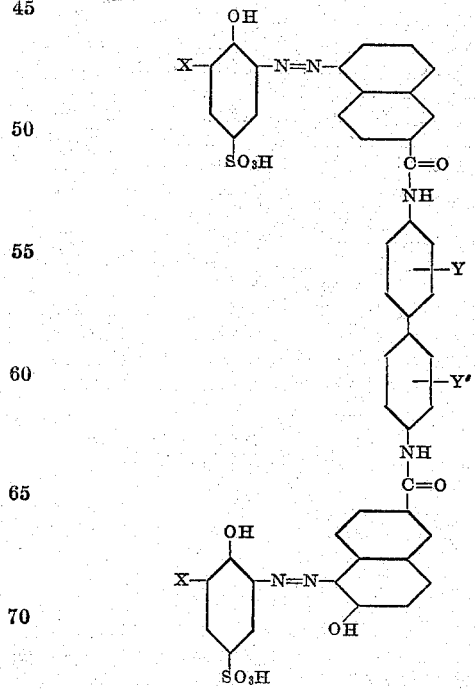

wherein X is a member of the group consisting of hydrogen, chlorine, alkyl and the nitro group, and Y and Y' are members of the group consisting of hydrogen, alkyl, alkoxy, chlorine, —COOH and —SO₃H, said dyes forming copper complex compounds and dyeing cotton red tints of good fastness.

3. The disazo dyes corresponding to the general formula

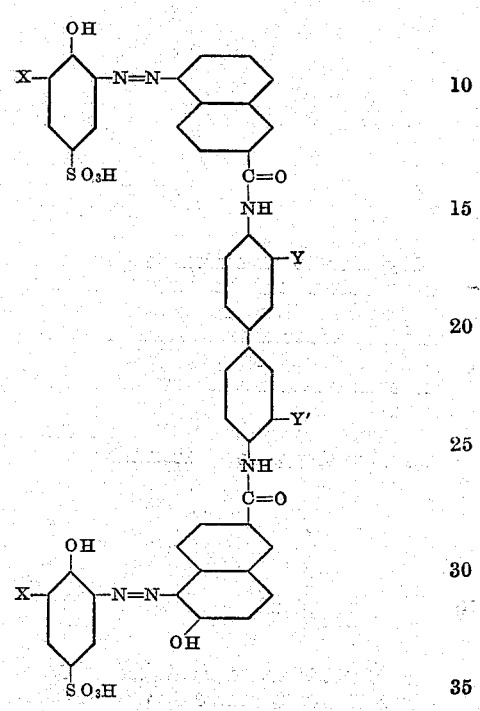

wherein X is a member of the group consisting of hydrogen, chlorine, alkyl and the nitro group, and Y and Y' are members of the group consisting of hydrogen, alkyl, alkoxy, chlorine, —COOH and —SO₃H, said dyes forming copper complex compounds and dyeing cotton red tints of good fastness.

4. The dye which corresponds to the formula

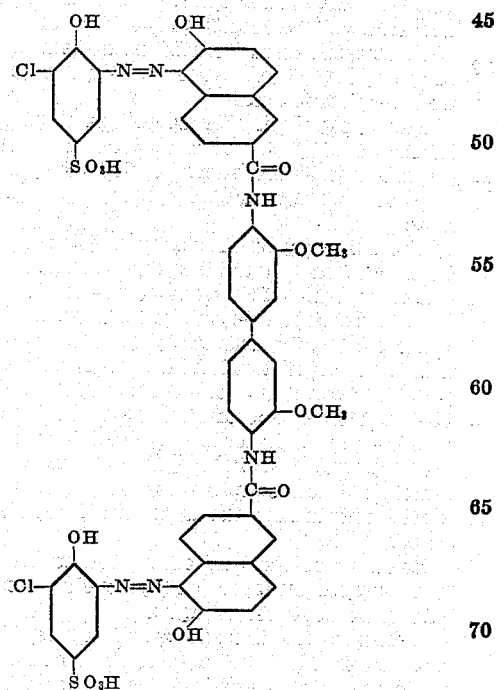

this dye forming a copper complex compound and dyeing cotton red tints of good fastness.

5. The dye which corresponds to the formula

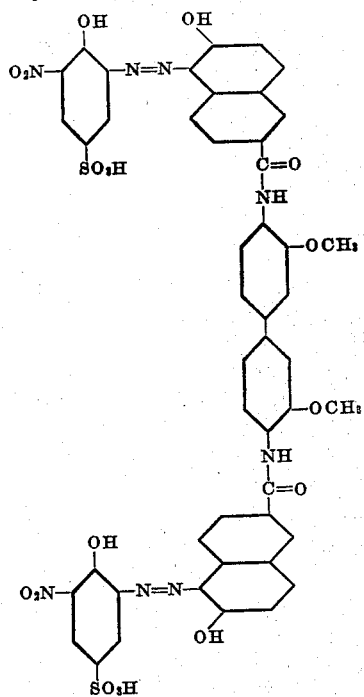

this dye forming a copper complex compound and dyeing cotton Bordeau-red tints of good fastness.

6. The process which comprises diazotizing a hydroxyaminobenzene sulfonic acid of the general formula

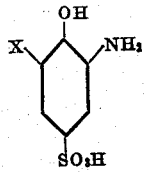

wherein X means a member of the group consisting of hydrogen, chlorine, alkyl and the nitro group, and coupling the diazo compound with bis-(2'-hydroxy-6'-naphthoyl) - 4.4' - diamino-3.3'-methoxydiphenyl.

7. The process which comprises diazotizing 1-hydroxy-2-amino-6-chlorobenzene-4-sulfonic acid and coupling the diazo compound with bis-(2'-hydroxy-6'-naphthoyl) - 4.4' - diamino-3.3'-methoxydiphenyl.

8. The process which comprises diazotizing 1 - hydroxy - 2 - amino-6-nitrobenzene-4-sulfonic acid and coupling the diazo compound with bis-(2'-hydroxy-6'-naphthoyl) - 4.4' - diamino - 3.3' - methoxydiphenyl.

WALTHER BENADE.